US011936427B2

(12) United States Patent
Rooymans

(10) Patent No.: US 11,936,427 B2
(45) Date of Patent: Mar. 19, 2024

(54) ELECTRONIC DEVICE FOR LI-FI COMMUNICATION AND GEOLOCATION

(71) Applicant: Dutch Innovation B.V., Oss (NL)

(72) Inventor: Johannes Otto Rooymans, Oss (NL)

(73) Assignee: Dutch Innovation B.V., Oss (NL)

( * ) Notice: Subject to any disclaimer, the term of this patent is extended or adjusted under 35 U.S.C. 154(b) by 143 days.

(21) Appl. No.: 17/614,345

(22) PCT Filed: Jun. 4, 2020

(86) PCT No.: PCT/NL2020/050363
§ 371 (c)(1),
(2) Date: Nov. 25, 2021

(87) PCT Pub. No.: WO2020/246885
PCT Pub. Date: Dec. 10, 2020

(65) Prior Publication Data
US 2022/0224412 A1    Jul. 14, 2022

(30) Foreign Application Priority Data
Jun. 4, 2019 (NL) ........................ 2023258

(51) Int. Cl.
*H04B 10/116* (2013.01)
*G01S 1/04* (2006.01)
(Continued)

(52) U.S. Cl.
CPC .......... *H04B 10/116* (2013.01); *G01S 1/0423* (2019.08); *G01S 1/7034* (2019.08); *H04B 10/1143* (2013.01); *H04B 10/1149* (2013.01)

(58) Field of Classification Search
CPC .............. H04B 10/116; H04B 10/1143; H04B 10/1149; G01S 1/7034; G01S 1/0423
(Continued)

(56) References Cited

U.S. PATENT DOCUMENTS

| 2007/0025738 A1* | 2/2007 | Moore ............... H04B 10/1149 398/189 |
| 2012/0086345 A1* | 4/2012 | Tran ........................ F24F 11/30 315/158 |

(Continued)

FOREIGN PATENT DOCUMENTS

| CN | 103297137 A | * | 9/2013 |
| CN | 103297137 A | | 9/2013 |

OTHER PUBLICATIONS

Mcbride et al., "Transitioning to Hybrid Radio/Optical Networks: Development of a Flexible Visible Light Communication Testbed", 1st International Conference on 5G for Ubiquitous Connectivity, ICST, Nov. 26, 2014, pp. 222-228.

(Continued)

*Primary Examiner* — Dalzid E Singh
(74) *Attorney, Agent, or Firm* — Farber LLC; Jonathan A. Winter

(57) ABSTRACT

Electronic device including
  a lighting device, capable of illuminating a room or the like;
  a photodetector;
  an ultra-wideband pulse transmitter;
  an ultra-wideband pulse receiver;
  a controller, connectable to the internet;
where the controller is adapted for coding a signal and transmitting it to the lighting device and/or to the pulse transmitter, and for decoding a signal received by the photodetector or the pulse receiver; the lighting device is adapted to transmit the signal as a LiFi signal and the pulse transmitter is adapted to transmit the signal as a UWB signal.

20 Claims, 3 Drawing Sheets

(51) Int. Cl.
*G01S 1/70* (2006.01)
*H04B 10/114* (2013.01)

(58) Field of Classification Search
USPC .......................................................... 398/118
See application file for complete search history.

(56) References Cited

U.S. PATENT DOCUMENTS

| | | | |
|---|---|---|---|
| 2015/0093107 A1* | 4/2015 | Jovicic | H04B 10/116 398/25 |
| 2015/0147067 A1* | 5/2015 | Ryan | H05B 47/19 398/118 |
| 2015/0318922 A1* | 11/2015 | Poola | H05B 45/10 398/45 |
| 2016/0072581 A1* | 3/2016 | Ikehara | H04B 10/116 398/118 |
| 2017/0042005 A1 | 2/2017 | Knapp | |
| 2018/0054706 A1 | 2/2018 | Kastee et al. | |
| 2018/0324933 A1* | 11/2018 | Hammett | H04W 4/80 |
| 2019/0020413 A1 | 1/2019 | Park et al. | |
| 2019/0166574 A1 | 5/2019 | Abou-Rizk et al. | |
| 2019/0191521 A1* | 6/2019 | Kim | G01S 13/56 |
| 2022/0107182 A1* | 4/2022 | Colas | B60W 40/10 |

OTHER PUBLICATIONS

Zafari et al., "A Survey of Indoor Localization Systems and Technologies", arxiv.org, Cornell University Library, 201 Olin Library Cornell University Ithaca, NY 14853, Sep. 4, 2017.

* cited by examiner

ELECTRONIC DEVICE FOR LI-FI COMMUNICATION AND GEOLOCATION

BACKGROUND OF THE INVENTION

1. Field of the Invention

The present invention relates to an electronic device for LiFi communication and geolocation, to a network comprising electronic devices, to a beacon, to an assembly of such a network and a beacon, and to a method for locating a beacon.

2. Description of the Related Art

LiFi or Li-Fi (Light Fidelity) is a means of wireless data communication which enables transmitting large amounts of data at a very fast rate. Li-Fi as currently practiced, is essentially temporal modulation of light signals. The modulations are not periodic but random, such that the Li-Fi signals do not interfere with other types of radiation. A device that allows geolocalisation using Li-Fi is disclosed in WO2017005826.

However, Li-Fi only works with a direct or indirect line of sight between the transmitter and the receiver of the light. It is thus impossible to communicate by Li-Fi with a device if this device is for instance located in a pocket or behind a door/wall. This property severely limits the application of Li-Fi communication, in particular if used for geolocation purposes.

In light of the above, it would be desirable to provide solutions which at least partially overcome some of the inconveniences of the prior art.

SUMMARY OF THE INVENTION

According to the invention there is provided an electronic device comprising: a lighting device, capable of illuminating a room or the like; a photodetector; an ultra-wideband (UWB) pulse transmitter; an UWB pulse receiver; a controller, adapted for encoding a signal and transmitting the signal to the lighting device and/or to the pulse transmitter, and for decoding a signal received by the photodetector or the pulse receiver; wherein the lighting device is adapted to transmit the signal as a Li-Fi signal and the pulse transmitter is adapted to transmit the signal as a UWB signal.

Using a Li-Fi signal in combination with an ultra-wideband (UWB) pulse or signal, the electronic device is suitable for wireless communication which is not limited by the line of sight. The Li-Fi signal and UWB pulses may transmit the same data, such that the UWB can form a back-up when there is an interruption in the open line of sight in the transmission path. The difference between a UWB signal and light is that the signal can pass through walls and closed doors whereas Li-Fi light signals will not penetrate through such objects. The range of UWB signals is reciprocal to the data speed, meaning that the higher the data rate the shorter the range. The UWB range is quite similar to the range of Li-Fi (~10-30 m) but for low data speeds the range of UWB can exceed that of Li-Fi.

The UWB pulses or signals are sometimes also referred to as impulse radio signals, and cover most of the spectrum in the range 3.1-10.6 GHz. As these pulses are not periodic, there is no frequency, which means that the pulses do not interact with other radiation or with other (reflected) UWB pulses. This is beneficial for maintaining data integrity and security. The typical power emission of UWB signals is low, in the microwatt range. The electronic device does not produce measurable radio waves or harmful electric fields. The pulses are hidden in the natural background electromagnetic noise which is always present due to cosmic radiation and the accumulation of other natural sources.

The electronic device is suitable for geolocation or tracking and tracing of objects, since this requires only limited amounts of data communication via UWB. This small amount of data makes it possible to operate at a relatively large range. At short ranges, larger amounts of data can be communicated by the electronic device.

The lighting device is capable of illuminating a room, in the same way as a conventional light bulb or light-emitting diode (LED) lighting device. In other words, a network of electronic devices provides the required light in a building at night, i.e. may replace the network of lights in the building. Each lighting device may be rated to emit between 100 lumens and 5000 lumens at full power, preferably more than 400 lumens or more than 800 lumens or optionally more than 1000 lumens.

The Li-Fi and UWB are physically different technologies which are, in the present invention, generated and processed through the same electronic device. The controller is configured for multiplexing, encoding/decoding and generating data simultaneously as LiFi and UWB signals. The result is modulated light with an UWB signal on top of it, generated by the electronic device. Preferably, the LiFi signal is a block signal, wherein the moment of rising of the intensity corresponds to the emission of an UWB pulse. In this way, the start of the LiFi signal is simultaneous with the UWB pulse. The end of the LiFi signal preferably does not correspond to a UWB pulse, such that the length of the LiFi signal does not matter for the UWB transmission.

The controller is part of the electronic device and preferably mounted on or close to the lighting device and UWB transmitter. The signal transmitted by the controller has a high frequency, which is deteriorated when long cables/wires are used. Preferably, the number of lighting devices and controllers are thus equal such that each controller is associated with a lighting device. It is not excluded that controllers may be shared between different lighting devices when they are placed close to one another.

In an embodiment, light emitted by the lighting device can be modulated for data transmission with a duty cycle of 3% to 10%, such that the lighting device is off only 3% to 10% of the time. In this way, there is very limited harm to the illumination properties of the lighting device. In some embodiments, the modulations may vary over time. While in night conditions when illumination is required, the light may be mostly on, in day conditions the light may be mostly off. During day time the lighting device may for instance be modulated such that it is off for >90% of the time and producing only very short light pulses which are not visible by the eye. This would reduce energy when the light is not needed for illumination but only for data communication. The light pulse duty cycle can be modified from 3% to 30% when data transmission is needed and when a further reduction of the light intensity is possible. In an embodiment, the lighting device may be modulated for data transmission substantially independently of the degree of illumination.

The use of UWB pulses has significant advantages over radio-frequency (RF) communication: the field strength of UWB is much lower (i.e. UWB consumes much less energy) and the speed of data transmission is much higher using UWB. RF communication may suffer from interference of radio waves, which may disturb the communication. RF signals can propagate relatively far leading to a loss of control of the information and limited security. Furthermore, the use of RF signals is bound by regulations because of the field strength and often not allowed in areas with sensitive measuring equipment, hospitals or high explosion risk areas.

Another advantage of UWB versus RF signals is that the time of flight (ToF) of the UWB signal can be measured very accurately. ToF measurements with UWB are used for location and asset tracking using beacons or signal tags. UWB antennas or anchors distributed in a warehouse or building measure the ToF and calculate the position of the signal tag with decimetre accuracies. The location signal reaches distances up to hundreds of meters or more since the data rate can be low when only a tag identification code must be identified. With the present invention, each lamp or lighting device in the building can act as an antenna for location tracking, which makes separate UWB antennas unnecessary. A network of electronic devices may thus replace the network of lamps in a building as well as the tracking antennas.

In an embodiment, the lighting device comprises one or more LEDs, preferably phosphor-less LEDs and/or chip-on-board (COB) LEDs. COB LEDs have a better visual appearance for more realistic lighting. Alternatively, the lighting device may comprise laser LEDs or VCSELs (vertical cavity surface-emitting emitting lasers). The lighting device may include light sources in the colours red, cyan and blue or red, green and blue or red, yellow and blue. Since the lighting device requires fast switching for sending the LiFi signals, phosphors for converting blue light into white light are not convenient since they have a decay. Therefore, at least one or all of the light sources are phosphor-less. Preferably the lighting device (or at least one of the light sources) is capable of switching at a frequency of about 2 MHz. The switching of the lighting device (or at least one of the light sources) may be done by means of a transistor such as a field-effect transistor (FET).

In an embodiment, one or more of the LEDs are capable of emitting LiFi signals, and one or more of the LEDs are not capable of emitting LiFi signals.

Preferably, the correlated colour temperature of the light emitted by the lighting device can be controlled, preferably by the controller.

The electronic device may also comprise an infrared (IR) transmitter, which is connected to the controller in order to be able to emit LiFi signals, either in addition to the lighting device or instead of the lighting device. The IR transmitter may offer a third path for data transmission in parallel to the LiFi and UWB routes. Alternatively, it might be used to replace the LiFi route during periods when illumination of the area with visible light is not desirable e.g. when persons or animals in the location are sleeping or at rest.

The UWB transmitter may be a semiconductor integrated circuit including a transistor such as a FET. The UWB transmitter may comprise a complementary metal oxide semiconductor (CMOS) circuit or another switching device.

The UWB receiver is preferably able to detect the signals with nanosecond accuracy for accurate ToF measurements.

The controller is preferably able to perform the multiplexing and demultiplexing of the signal. In an embodiment, the controller is able to process the signal by means of pulse position modulation (PPM). The multiplexing is done in order to code the signal such that a receiver is able to detect the start and end of each bit or byte in the signal sequence. It is important that the signal is coded in a non-periodic manner.

The electronic device may be able to turn off either the Li-Fi signals or the UWB signals, depending on the purpose, desired range and data rate of the communication.

In an embodiment, at least three of the lighting device, the photodetector, the pulse transmitter, the pulse receiver, and the controller are mounted on a single chip, preferably wherein the lighting device, the photodetector, the pulse transmitter, the pulse receiver, and the controller are all mounted on a single chip. This will be beneficial for production and implementation purposes.

In accordance with the effects and advantages described hereinabove, the invention also relates to a network for determining the location of a beacon, comprising a plurality of electronic devices as described herein, which are spaced apart and distributed over an enclosed area or volume such as a building; the network further comprising a central processor, connected via wired or wireless communication to the electronic devices and adapted to determine a position of a beacon relative to the positions of the electronic devices, by means of LiFi and/or UWB signals transmitted from the beacon to the electronic devices or vice versa.

The network of electronic devices forms a grid. The central processor has access to the exact locations of the electronic devices. Since the travel times of the pulses between the electronic devices and the beacon are accurately measured, the location of the beacon can be precisely determined if at least three electronic device communicate with the beacon. The typical distance between the electronic devices and the beacon in the grid is the distance between adjacent lamps in a building. Usually this distance is only a few meters, which means that therefore the ToF can be determined with centimetre accuracy. The position data of the electronic devices are preferably three-dimensional, such that the precise location of the beacon can be determined. For instance, in a building with multiple floors the network can identify at which floor the beacon is located.

Preferably, the electronic devices are adapted to be mounted on the walls and/or ceilings of a building, such that they are well-positioned for illuminating the space around them, e.g. the room in which they are mounted. The network may comprise at least 10 electronic devices or even more.

In an embodiment, each controller in the network is associated to a single lighting device, and preferably mounted on the same chip as the lighting device. This allows for limited distances between controllers and lighting devices and detector/receiver, such that the quality of the signal is kept high.

In an embodiment, the controllers of the electronic devices are connected to one another and to the central processor via ethernet cables. The electronic devices may be powered over ethernet and/or by a DC power supply.

In accordance with the effects and advantages described hereinabove, the invention also relates to a building comprising a network as described above, wherein the electronic devices are mounted on walls and/or ceilings of rooms within the building, preferably distributed over several different floors of the building. Such a building may be a hospital, a museum, a shopping centre, a warehouse and the like.

The invention also relates to a beacon for use in a network as described above, the beacon comprising: a lighting device for emitting LiFi signals in visible light or IR; an UWB pulse transmitter; a photodetector for detecting LiFi signals; an UWB pulse receiver; a controller, adapted for encoding a signal and transmitting the signal to the lighting device and/or to the pulse transmitter, and for decoding a signal received by the photodetector or the pulse receiver; wherein the lighting device is adapted to transmit the signal as a LiFi signal and the pulse transmitter is adapted to transmit the signal as an UWB signal. The beacon may be integrated in a mobile phone, or it may be a separate component such as a tag which can be attached to an object which is to be tracked or located.

The interaction between electronic device and beacon may be reversed, maintaining the same benefits. Therefore, the advantages and effects of the electronic device, related to the LiFi and UWB communication, also apply to the beacon.

In accordance with the effects and advantages described hereinabove, the invention also relates to an assembly of a network of electronic devices and at least one beacon; wherein each electronic device comprises a lighting device capable of emitting light to illuminate a room or the like; and wherein the beacon is able to send LiFi and/or UWB signals and the electronic devices are able to receive the LiFi and/or UWB signals; or the electronic devices are able to send LiFi and/or UWB signals and the beacon is able to receive the LiFi and/or UWB signals.

In accordance with the effects and advantages described hereinabove, the invention also relates to a method for determining the location of a beacon in a network of electronic devices, wherein the electronic devices each include a lighting device, wherein the beacon is capable of sending and/or receiving LiFi and/or UWB signals, comprising the steps of periodically transmitting a LiFi and/or UWB signal by the beacon and/or the electronic devices; detecting the LiFi and/or UWB signal by the other one of the beacon and/or the electronic devices; and calculating the position of the beacon with respect to the electronic devices using time-of-flight measurements applied to the LiFi and/or UWB signals.

The method can be used for tracking packages in warehouses, for locating equipment in hospitals, for positioning or navigation in large buildings or shopping centres, for transmitting data of cattle (including positions) in a barn, for transmitting information about paintings in a museum to devices or mobile phones used by visitors, or the like.

BRIEF DESCRIPTION OF THE DRAWINGS

The features and advantages of the invention will be further appreciated upon reference to the following schematic drawings of a number of exemplary embodiments, in which corresponding reference symbols indicate corresponding parts.

The figures are for illustrative purposes only, and do not serve as a restriction on the scope or the protection as laid down by the claims.

DESCRIPTION OF ILLUSTRATIVE EMBODIMENTS

Figure 1:
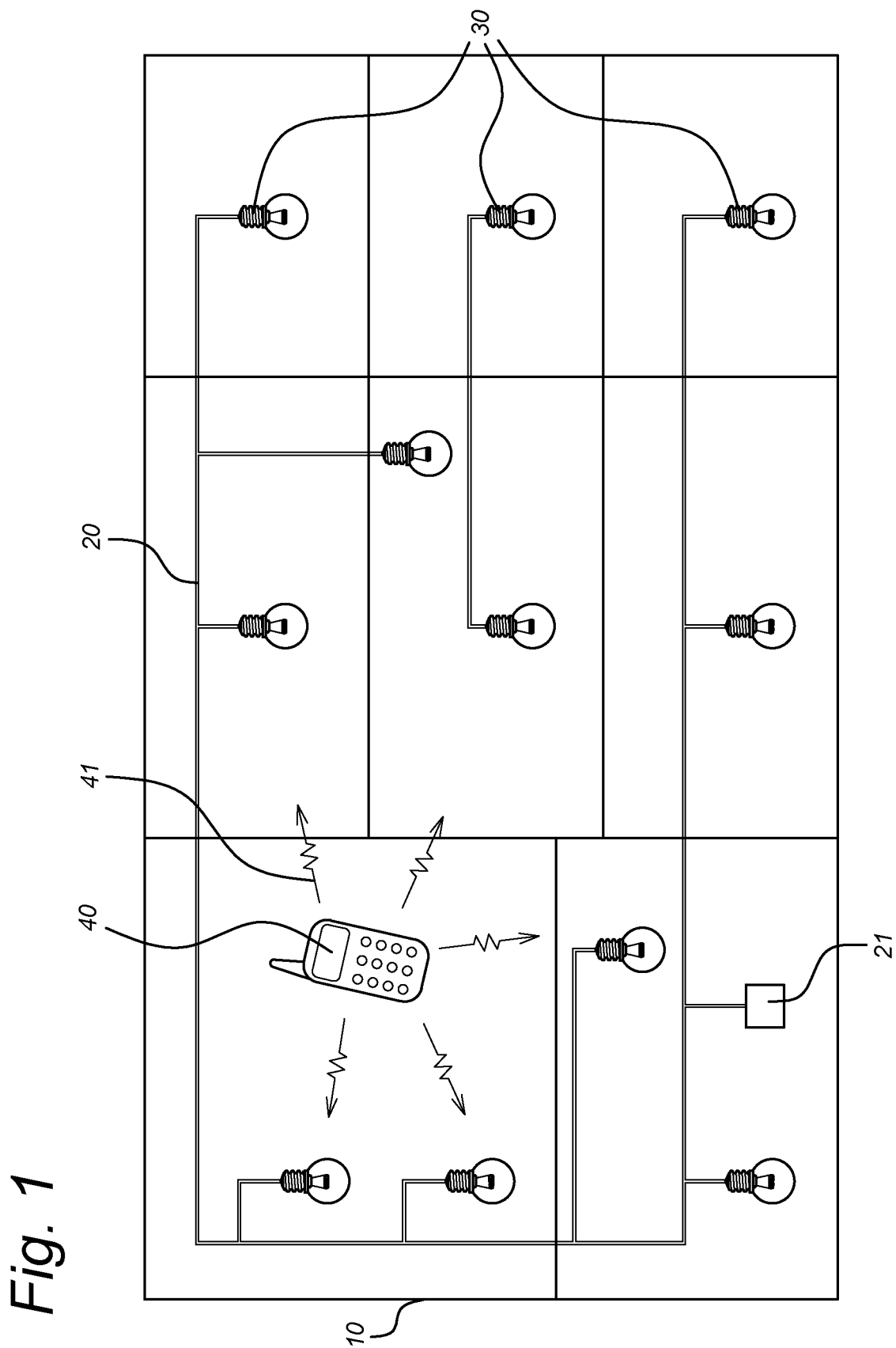
FIG. 1 shows a floor plan of a building comprising a network of electronic devices according to an embodiment.

FIG. 1 schematically shows a floor plan of a building 10 comprising a network 20 of electronic devices 30 (depicted schematically as light bulbs) which together form a grid covering the building 10. Although only a single floor is shown, a person skilled in the art understands that the network 20 may cover several or all floors in the building 10.

The electronic devices 30 are adapted to emit light (such that they act as conventional lamps) and are also connected to receive data over the network 20 e.g. via ethernet. The light emitted by the electronic devices 30 can be modulated such that LiFi signals are transmitted. The electronic devices 30 further comprise pulse transmitters for transmitting UWB pulses. Within the grid, a beacon 40 (depicted as a mobile phone, but not limited thereto) is located which is able to receive and/or send LiFi and/or UWB pulses. Preferably, the beacon 40 periodically emits UWB pulses 41 comprising information about the identity of the beacon, which can be detected by the electronic devices 30 in the network 20 and which are not blocked by the internal walls of the building 10.

The network 20 comprises a central processor 21 which includes or has access to information regarding the precise positions of the electronic devices 30. The central processor 21 is able to perform time-of-flight measurements of the UWB pulses with respect to the different electronic devices 30, in order to calculate the (three-dimensional) position of the beacon 40. Such measurements are explained for instance in U.S. Pat. No. 6,054,950, which is incorporated herein in its entirety by reference. In this way, accurate tracking and tracing of the beacon 40 is possible, without the need of separate UWB antennas. Since the data transmission rate is reciprocal to the range of the signals, the network 20 is able to communicate faster or transmit more data when the grid is denser. With 1 Mbit/s the range may be a couple of meters, but with a lower rate—for instance if only an identity tag is transmitted—this may be up to hundreds of meters or even more.

Figure 2:
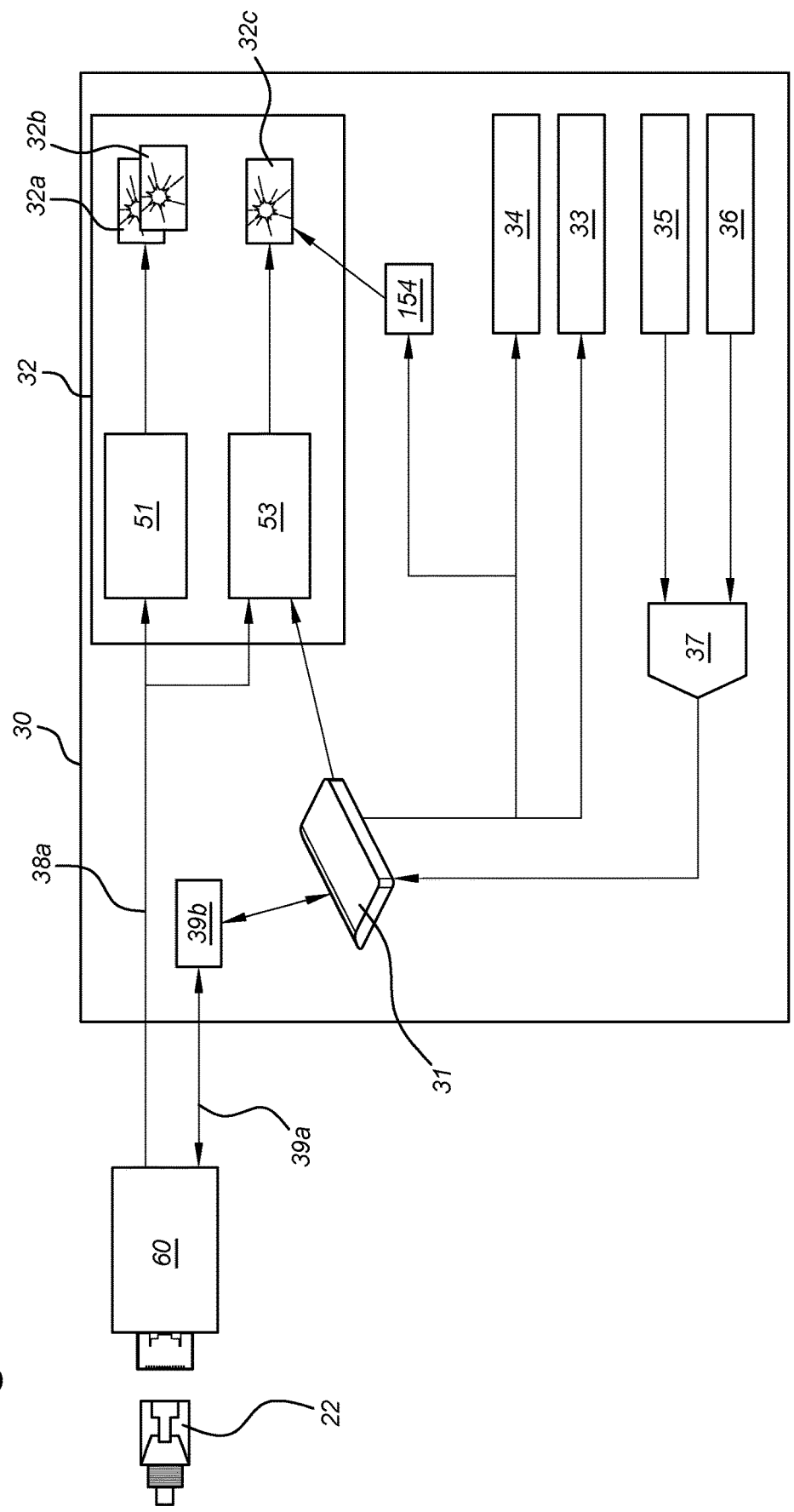
FIG. 2 shows a block diagram of an electronic device according to an embodiment.

FIG. 2 schematically shows a block diagram of an electronic device 30, which is connectable to a network via an ethernet cable 22. The electronic device 30 is powered via the ethernet cable 22, although may alternatively be powered separately via a DC power supply. A power-over-ethernet splitter 60 splits the power and data transmission. The electronic device 30 comprises a controller 31, a lighting device 32 adapted to emit visible light, an UWB transmitter 33, a photodetector 35 and an UWB pulse receiver 36. A power cable 38a delivers power to the lighting device 32 and a data cable 39a connects to a LAN node 39b which is connected to the controller 31. The depicted embodiment also comprises an infrared transmitter 34 and separate blue, cyan and red light sources 32a, 32b, 32c. The relative intensities of the light sources are individually controlled by means of regulators 51, 53.

The controller 31 is arranged to generate a digital signal which is transmitted simultaneously as LiFi signal by the red light source 32c (via a FET switch 154) and the infrared transmitter 34, and by the UWB transmitter 33. The signal may be identity information to identify the electronic device 30, or data received via the network. A person skilled in the art will understand that the signal may alternatively be transmitted only via one or two of the red light source 32c, the infrared transmitter 34 and the UWB transmitter 33. Alternatively, different signals may be transmitted via the different transmitters 33, 34 and the lighting device 32.

The depicted electronic device 30 is also able to selectively detect LiFi signals using the photodetector 35 and UWB signals by the pulse receiver 36. An or-gate 37 allows the controller 31 to receive either UWB signals or LiFi signals. The controller 31 is arranged to decode the signal and convert it into usable data which can be communicated with the network 20. The controller 31 may also be able to separately control the amount of red light emitted by the lighting device 32 such that the correlated colour temperature (CCT) can be varied.

Figure 3:
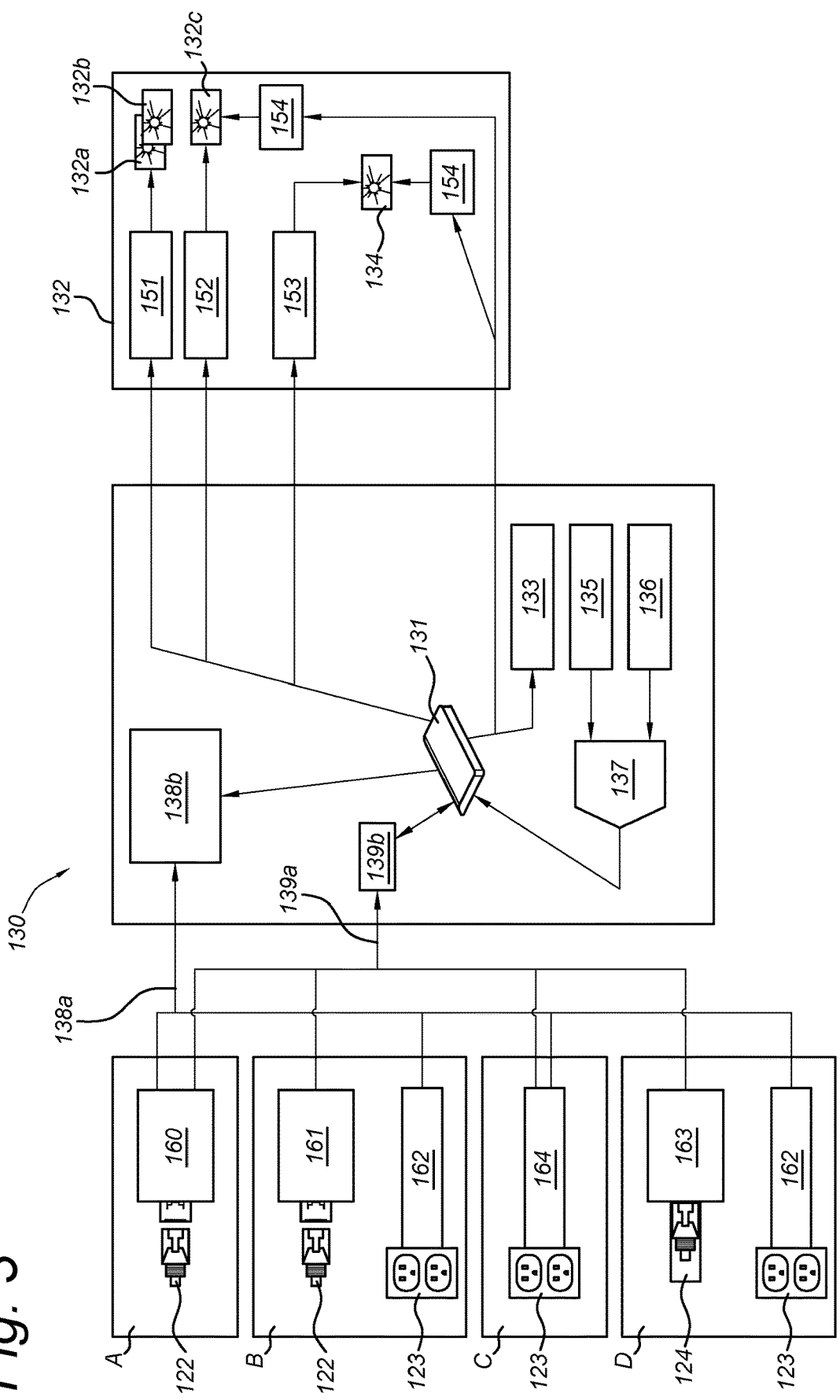
FIG. 3 shows a block diagram of an electronic device according to an embodiment.

FIG. 3 schematically shows a block diagram of an electronic device 130 according to another embodiment. The electronic device 130 operates in a similar manner to the electronic device shown in FIG. 2 and like features are designated with the same reference numerals preceded by 100.

The left hand side of FIG. 3 illustrates the different options for power and data supply. Option A is similar to the embodiment shown in FIG. 2: an ethernet cable 122 with a power-over-ethernet splitter 160 splitting power and data and delivering them to a power regulator 138b (via power cable 138a) and a LAN node 139b (via data cable 139a), respectively. Option B uses an ethernet cable 122 with ethernet adapter 161 for data communication and a power grid connection 123 and current driver 162 for power supply. Option C uses power line communication (PLC) using a power grid connection 123 with PLC splitter 164. Option D uses a fiber optic cable 124 and adapter 163 for ethernet connection and a power grid connection 123 with current driver 162 for power supply. Depending on the type of the network, any of these options may be implemented, although alternatives for data transmission and power supply are not excluded.

The power regulator 138b powers the lighting device 132, the controller 131 and the other components of the electronic device 130. The lighting device 132 comprises visible light sources 132a, 132b, 132c and an infrared transmitter 134. The relative intensities of the light sources are controlled by regulators 151, 152, 153. In this way, the correlated colour temperature (CCT) and the LiFi intensity can be varied. The LiFi signal is generated by the controller 131 and transmitted via switches 154 (e.g. FETs) to the red and infrared light sources 132c, 134, such that these light sources emit the LiFi signal.

As in FIG. 2, the electronic device 130 also comprises an UWB transmitter 133, and a photodetector 135 and UWB pulse receiver 136 which are connected to the controller via an or-gate 137.

The invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. An electronic device comprising:
 a lighting device, capable of illuminating a room or the like;
 a photodetector;
 an ultra-wideband (UWB) pulse transmitter;
 a UWB pulse receiver;
 a controller, adapted for encoding a signal and transmitting the signal to the lighting device and to the pulse transmitter, and for decoding a signal received by the photodetector or the pulse receiver;
 wherein the lighting device is adapted to transmit the signal as a LiFi signal and the pulse transmitter is adapted to transmit the signal as a UWB signal in combination with and simultaneously with the LiFi signal.

2. The electronic device according to claim 1, wherein at least three of: the lighting device, the photodetector, the pulse transmitter, the pulse receiver, and the controller, are mounted on a single chip, preferably wherein the lighting device, the photodetector, the pulse transmitter, the pulse receiver, and the controller are all mounted on a single chip.

3. The electronic device according to claim 1, wherein the lighting device comprises one or more LEDs, preferably phosphor-less LEDs and/or chip-on-board LEDs.

4. The electronic device according to claim 3, wherein the lighting device comprises a plurality of LEDs, and wherein one or more of the LEDs are capable of emitting LiFi signals, and one or more of the LEDs are not capable of emitting LiFi signals.

5. The electronic device according to claim 1, wherein correlated colour temperature of the light emitted by the lighting device can be controlled, preferably by the controller.

6. The electronic device according to claim 1, further comprising an infrared transmitter which is capable of emitting LiFi signals.

7. The electronic, device according to claim 1, wherein light emitted by the lighting device is adapted to transmit LiFi signals with a duty cycle of 3% to 10%, such that the lighting device is turned off 3% to 10% of time.

8. A network for determining the location of a beacon, the network comprising a plurality of the electronic device according to claim 1, which are spaced apart and distributed over an enclosed area or volume such as a building; further comprising a central processor, connected via wired or wireless communication to the plurality of electronic devices and adapted to determine a position of the beacon relative to the positions of the plurality of electronic devices, by means of LiFi and/or UWB signals transmitted from the beacon to the plurality of electronic devices or vice versa.

9. A method for determining the location of a beacon in a network of electronic devices including the electronic device of claim 1, wherein the electronic devices each include the lighting device, and wherein the beacon is capable of sending and/or receiving the LiFi and/or UWB signals, the method comprising the steps of:
 periodically transmitting the LiFi and/or UWB signal by the beacon and/or the electronic devices;
 detecting the LiFi and/or UWB signal by the other one of the beacon and/or the electronic devices; and
 calculating the position of the beacon with respect to the electronic devices using time-of-flight measurements applied to the LiFi and/or UWB signals.

10. The network according to claim 8, wherein each controller is associated to a single lighting device, and preferably mounted on the same chip as the lighting device.

11. The network according to claim 8, wherein the controllers of the plurality of electronic devices are connected to one another and to the central processor via ethernet cables.

12. The network according to claim 8, wherein the plurality of electronic devices are powered over ethernet and/or by a DC power supply.

13. The network according to claim 8, wherein the plurality of electronic devices are adapted to be mounted on a wall and/or a ceiling within the building.

14. A building comprising the network according to claim 8, wherein the plurality of electronic devices are mounted on walls and/or ceilings of rooms within the building, preferably distributed over several different floors of the building.

15. A beacon for use in the network according to claim 8, comprising:
 a lighting device for emitting visible or infrared light;

a UWB pulse transmitter;

a photodetector for detecting LiFi signals;

a UWB pulse receiver;

a controller, adapted for encoding a signal and transmitting the signal to the lighting device and to the pulse transmitter, and for decoding a signal received by the photodetector or the pulse receiver;

wherein the lighting device is adapted to transmit the signal as a LiFi signal and the pulse transmitter is adapted to transmit the signal as a UWB signal in combination and simultaneously with the LiFi signal.

16. A network for determining the location of a beacon, the network comprising a plurality of electronic devices, which are spaced apart and distributed over an enclosed area or volume such as a building;

wherein each electronic device comprises:

a lighting device, capable of illuminating a room or the like;

a photodetector;

an ultra-wideband (UWB) pulse transmitter;

a UWB pulse receiver;

a controller, adapted for encoding a signal and transmitting the signal to the lighting device and/or to the pulse transmitter, and for decoding a signal received by the photodetector or the pulse receiver;

wherein the lighting device is adapted to transmit the signal as a LiFi signal and the pulse transmitter is adapted to transmit the signal as a UWB signal, and wherein the controller is configured for multiplexing, encoding/decoding and generating data simultaneously as LiFi and UWB signals, wherein the network further comprises a central processor, connected via wired or wireless communication to the plurality of electronic devices and adapted to determine a position of the beacon relative to the positions of the plurality of electronic devices, by means of LiFi and/or UWB signals transmitted from the beacon to the plurality of electronic devices or vice versa.

17. The network according to claim 16, wherein the controllers of the plurality of electronic devices are connected to one another and to the central processor via ethernet cables.

18. The network according to claim 16, wherein the plurality of electronic devices are powered over ethernet and/or by a DC power supply.

19. A building comprising the network according to claim 16, wherein the plurality of electronic devices are mounted on walls and/or ceilings of rooms within the building.

20. A beacon for use in the network according to claim 16, comprising:

a lighting device for emitting visible or infrared light;

a UWB pulse transmitter;

a photodetector for detecting LiFi signals;

a UWB pulse receiver;

a controller, adapted for encoding a signal and transmitting the signal to the lighting device and/or to the pulse transmitter, and for decoding a signal received by the photodetector or the pulse receiver;

wherein the lighting device is adapted to transmit the signal as a LiFi signal and the pulse transmitter is adapted to transmit the signal as a UWB signal.

* * * * *